United States Patent [19]

Göldner et al.

[11] Patent Number: 5,292,797
[45] Date of Patent: Mar. 8, 1994

[54] WATER-SOLUBLE VINYL POLYMER SUSPENSION FOR USE AS A THICKENING AGENT, AND PROCESS FOR ITS PREPARATION

[75] Inventors: Ernst Göldner, Riedlingen; Martina Haas, Griesheim, both of Fed. Rep. of Germany

[73] Assignee: Roehm GmbH Chemische Fabrik, Darmstadt, Fed. Rep. of Germany

[21] Appl. No.: 992,757

[22] Filed: Dec. 18, 1992

[30] Foreign Application Priority Data

Dec. 18, 1991 [DE] Fed. Rep. of Germany ........ 4141693

[51] Int. Cl.$^5$ .............................................. C08K 5/05
[52] U.S. Cl. ................... 524/761; 524/379; 524/389; 524/556
[58] Field of Search ................ 524/761, 379, 389, 556

[56] References Cited

U.S. PATENT DOCUMENTS

| | | |
|---|---|---|
| 4,420,586 | 12/1983 | Bhattacharyya et al. |
| 4,554,018 | 11/1985 | Allen ................................... 524/833 |
| 4,722,958 | 2/1988 | Sauer et al. ........................... 524/379 |

FOREIGN PATENT DOCUMENTS 3221284 12/1983 Fed. Rep. of Germany .

*Primary Examiner*—Joseph L. Schofer
*Assistant Examiner*—Jeffrey T. Smith
*Attorney, Agent, or Firm*—Oblon, Spivak, McClelland, Maier & Neustadt

[57] ABSTRACT

A process for the preparation of a water-soluble polymer suspension, which dissolves rapidly in water, is provided wherein the polymer is prepared from a) 30 to 99.99% by wt. of an alkali, ammonium, or amine salt of acrylic or methacrylic acid or a mixture thereof, b) 0.01 to 5% of a crosslinking monomer having at least two polymerizable double bonds and c) 0 to 69.99% by wt. of one or more hydrophilic comonomers different from a) and b) above, and at least one solvent selected from the group consisting of oligoalkylene oxide compounds of formula I $$H + O - CH - CH_2 -)_n OR_1$$
   $\quad\ \ \ |$
   $\quad\ \ \ R$ where
R=H or CH$_3$
R$_1$=H, CH$_3$ or C$_2$H$_3$
n=2, 3 or 4, wherein the suspension contains no more than 0.5% by weight of water, based on the total amount of solvent, to give a thickener which is stable in long term storage and which, upon addition to water, yields a highly viscous, briefly separating, microgel-like solution.

6 Claims, No Drawings

WATER-SOLUBLE VINYL POLYMER SUSPENSION FOR USE AS A THICKENING AGENT, AND PROCESS FOR ITS PREPARATION

BACKGROUND OF THE INVENTION

1. Field of the Invention

The present invention relates to a simplified process for the preparation of a water-soluble vinyl polymer suspension and its use as a thickening agent.

2. Discussion of the Background

Suspensions of water-soluble or water-absorbing vinyl polymers having a high capacity to absorb water are known. These suspensions are typically used as thickeners.

EP 0 297 184 describes ionic resin emulsions having high water absorptivity. The emulsions are prepared by reversed phase emulsion polymerization of an aqueous solution of ionic monomers—in particular (meth)acrylic compounds—with 0.01 to 0.5 mol.% of a divinyl compound, such as methylene bisacrylamide or allyl acrylamide, in the presence of a radical former such as azobisisobutyronitrile.

DE-OS 24 51 599 describes a process to prepare fluid, water-dispersible suspensions comprising dry particles of water-soluble or water-absorbing vinyl polymers in liquid polyglycol or a liquid polyglycol ether. The polymers are prepared individually by polymerization of suitable water-soluble vinyl monomers, such as sodium acrylate, in a water in oil (w/o) emulsion, from which the water is subsequently removed by azeotropic distillation with hydrocarbon oils, such as xylene or halogenated hydrocarbons, at which time the liquid polyglycols or polyglycol ethers are added. Water-absorbing polymers are obtained by polymerization in the presence of crosslinking agents such as methylene bisacrylamide and allyl acrylate.

EP 0 097 808 discloses a water soluble thickener in suspension form. The thickener is a copolymer of an alkali or ammonium salt of acrylic or methacrylic acid with a crosslinking monomer having at least two polymerizable double bonds. The polymer is prepared from an essentially anhydrous solution of monomers in a low aliphatic alcohol, such as ethanol. After the polymer precipitates the alcohol-containing suspension is prepared by mixing with water. The polymer content of these suspensions ranges from 7 to 12% by wt. In example 5 of EP 0 097 808 the polymer content of the suspension is 8% by wt. and the suspension stability achieved was only satisfactory.

SUMMARY OF THE INVENTION

Accordingly, one object of the present invention is to provide a storage-stable thickener-suspension having a high content of the active substance in a solvent.

A further object of the present invention is to provide a storage-stable thickener-suspension containing a polymer of one or more (meth)acrylic acids or derivatives as the active ingredient.

Another object of the present invention is to provide a thickener-suspension which is biologically safe and has a flash point exceeding 130° C.

Another object of the present invention is to provide a simple process to prepare a storage-stable thickener-suspension.

These and other objects of the present invention have been satisfied by the discovery of an anhydrous water-soluble polymer suspension comprising more than 12% of a copolymer comprising a) 30 to 99.99% by wt. of an alkali, ammonium, or amine salt of acrylic or methacrylic acid or a mixture thereof, b) 0.01 to 5% of a crosslinking monomer having at least two polymerizable double bonds and c) 0 to 69.99% by wt. of one or more hydrophilic comonomers different from a) and b) above, and a solvent selected from the group consisting of oligoalkylene oxide compounds of formula I

where
R=H or $CH_3$
$R_1$=H, $CH_3$ or $C_2H_3$
n=2, 3 or 4, which exhibits long term storage stability and provides a good thickening effect. The suspension of the present invention can be prepared surprisingly in a one-step non-aqueous process to give a polymer suspension which is virtually free of water.

DETAILED DESCRIPTION OF THE PREFERRED EMBODIMENTS

The present invention relates to an anhydrous water-soluble polymer suspension comprising more than 12% of a copolymer comprising a) 30 to 99.99% by wt. of an alkali, ammonium, or amine salt of acrylic or methacrylic acid or a mixture thereof, b) 0.01 to 5% of a crosslinking monomer having at least two polymerizable double bonds and c) 0 to 69.99% by wt. of one or more hydrophilic comonomers different from a) and b) above, and at least one solvent selected from the group consisting of oligoalkylene oxide compounds of formula I

where
R=H or $CH_3$
$R_1$=H, $CH_3$ or $C_2H_3$
n=2, 3 or 4, and a process to prepare such an anhydrous suspension of a water-soluble polymer by polymerizing the monomers in one or more of the oligoalkylene oxide compounds of formula I as solvent in the absence of water.

Component (a) is an alkali, ammonium or organic amine salt of acrylic or methacrylic acid or a mixture of the two acids. Preferably component (a) is an alkali, ammonium or organic amine salt of acrylic acid. The alkali salts are derived from sodium, potassium, or lithium, preferably from sodium. Examples of organic amines which can be used to form the acid salt using conventional procedures include diethylamine, tributylamine, 2-aminoethanol, 2-dimethylaminoethanol and triethanolamine. Ammonium salts, prepared by reaction of ammonia with the desired acid under conventional conditions, are preferred. A portion of the salt component, preferably ≦50%, may be replaced by free acrylic or methacrylic acid or a mixture thereof.

Suitable crosslinking components (b) include diacrylates and dimethylacrylates of glycols, such as alkylene glycol dimethacrylate, divinyl benzene, or divinyl or diallyl esters of dibasic carboxylic acids, such as diallyl phthalate.

Preferably compounds with two double bonds of different reactivity, such as allyl (meth)acrylate, 2-vinyl oxyethyl methacrylate or N-allyl (meth)acrylamide, are added during radical polymerization.

A preferred polymer of the present invention is prepared by polymerizing 98 to 99.9% by wt. of ammonium (meth)acrylate, most preferably of ammonium acrylate, and 0.1 to 2% by wt. of crosslinking agents, most preferably with allyl (meth)acrylate or N-allyl (meth)acrylamide or a mixture thereof.

Preferably the polymer of the present invention is synthesized from components (a) and (b) only, but other components (c) can also be used in the synthesis, provided they do not have a negative impact on the solubility or absorbtivity of the polymer in water and the thickening properties. Therefore, the bulk of the suitable comonomers (c) must be highly hydrophilic or even water-soluble. Examples of such comonomers are acrylamides and methacrylamides, optionally substituted with low alkyl groups, low hydroxyalkyl esters of unsaturated polymerizable carboxylic acids, such as hydroxyethyl or hydroxypropyl (meth)acrylate, or (meth)acrylates of alkyl polyethylene glycols. While the comonomers (c) may have ionic or ionizable groups, it is preferred that component (c) have no ionic or ionizable groups, especially amino or ammonium groups. The use of comonomers (c) that do not fulfill these requirements such as (meth)acrylic acid alkyl ester having $C_1$ to $C_{26}$ alkyl groups in the synthesis of the polymers should be low, preferably not exceeding 5 to 10% by weight based on the total weight of polymer.

The polymer of the present invention is prepared by polymerization in an essentially anhydrous medium as a continuous phase under conventional polymerization conditions, preferably from 30° to 150° C., most preferably from 50° to 100° C. The water content of the medium may be at most 0.5 % by wt., preferably less than 0.1%, most preferably anhydrous (based on the medium). If the water content of the medium is higher than this value, the polymer tends to agglomerate. Oligoalkylene glycol compounds of formula I

where
R = H or $CH_3$
$R_1$ = H, $CH_3$ or $C_2H_3$
n = 2, 3 or 4,
that exhibit a flash point $\geq$ 120° C. (according to DIN 51 758), such as diethylene glycol, triethylene glycol, tetraethylene glycol, triethylene glycol monoethyl ether, dipropylene glycol, tripropylene glycol, and the monomethyl or monoethyl ethers of di and tripropylene glycols or mixtures thereof are added as the polymer-suspension medium according to the invention. They contain a maximum of 0.1% by wt. of water (Ullmann's Encyklopadie der technischen Chemie, 4th edition, volume 8, pages 200 to 205 and volume 19, pages 426 to 431). Tripropylene glycol is the preferred medium. Other compounds of formula I can be used in addition to or in place of tripropylene glycol. Mixtures of compounds that can also contain minor quantities (<10%, preferably <5%) of low molecular weight or polymolecular homologs of the oligoalkylene compounds or mixtures thereof can also be used as the suspension medium.

Since salts of (meth)acrylic acid are generally difficult to obtain, the free acid and the crosslinker are preferably dissolved in the oligoglycolic medium and the acid is then converted in part or totally into the salt. To avoid the formation of undesirable quantities of water, the reaction mixture is neutralized by addition to the medium of gaseous ammonia, anhydrous amines or alkali alcoholates, such as the glycolic alkali alcoholates or alkali metals. The quantity of the salt-forming, basic component needed is based on the desired degree of neutralization.

The process of the present invention may use a polymerization initiator of anionic, cationic or radical type, to start the polymerization reaction, with a radical polymerization initiator being preferred. Suitable radical initiators include organic peroxides such as dicumyl peroxide, t-butyl perpivalate, dibenzoyl peroxide, or di-t-butyl peroxide, and azo compounds such as azobisisobutyronitrile (AIBN), with t-butyl perpivalate and AIBN being preferred. The initiators are used in conventional amounts, preferably from 0.001 to 0.1% by weight, based on the amount of polymer.

The polymer of the present invention has a number average molecular weight of from 10,000 to 1,000,000, preferably from 50,000 to 500,000.

The other monomer components and a radical polymerization initiator are optionally added to the (meth)acrylic acid salt-continuous phase and the mixture is raised to the polymerization temperature while stirring or it is allowed to flow gradually into an agitated tank maintained at the polymerization temperature. Dispersion agents and distribution agents are generally unnecessary. As the polymerization reaction proceeds, the polymer precipitates as very fine, more or less beaded suspension particles.

The suspensions prepared according to the present invention are used as thickeners.

The process of the present invention provides a simple, one-step preparation of polymer suspensions having a high solids content. Surprisingly the suspensions of the present invention have a high stability in storage—tested up to 6 months to date—and exhibit a significantly higher dry content than the suspensions according to EP 0 097 808—by a factor of 2-3. The polymer-suspensions obtained according to the process of the present invention show in their application very good intrinsic and external thickening, with a high flash point of $\geq$ 120° C., due to the use as solvent of the oligoalkylene glycol compounds of formula I. As a consequence of their very low toxicity and good biodegradability they are also environmentally acceptable and ecologically safe.

The polymer suspension is quite resistant to storage and dissolves rapidly and completely in water with stirring.

The polymer suspension of the present invention can be metered reliably and is intended primarily as a thickener to thicken neutral or alkaline, aqueous systems, such as dispersions for paints, printing inks, textile auxiliary agents or cosmetic preparations.

Depending on the desired thickening, the thickener is added in quantities ranging from 0.1 to 5% by wt., preferably 0.2 to 2% by wt, calculated on the basis of the amount of polymer added. The complete thickening effect is achieved generally within a few minutes after stirring into water.

By adding the thickener of the present invention, water or aqueous systems can be thickened without any other additives, resulting in a polymer content of 0.25–1% by wt., preferably 0.5–1% by wt. and a viscosity from 1,000 to 200,000 mPas, preferably from 100,000 to 200,000 mPas.

EXAMPLES

A. Preparation of the Thickeners

Example 1

Into a 1 liter Witt vessel, equipped with a vane stirrer, thermometer, condenser and delivery tube, 650 g of tripropylene glycol, 130 g of acrylic acid and 1.95 g of methacrylic acid allyl ester were added and an excess of ammonia gas was introduced while stirring and cooling; (excess gas escaped into a safety vessel filled with 2% sulfuric acid). After the ammonia was completely added, the slightly viscous solution was treated with 0.15 g of t-butyl perpivalate and heated to 80° C. to provide a viscous, slightly yellowish suspension. After two hours at the reaction temperature, 1.0 g of t-butyl perpivalate was added and one hour later the same quantity of t-butyl perpivalate was again added. The mixture was then stirred for 3 hours at 80° C. and cooled.

Appearance: homogenous, beige suspension
Solid content: approximately 17%
Current viscosity: 3,000–20,000 mPa.s
Stability in storage;

After approx. 2 weeks a very small solvent residue was present, which did not increase over months; product was very slightly homogenizable.

Example 2

Into a 1 liter Witt vessel, equipped with a vane stirrer, thermometer, condenser and delivery tube, 500 g of tetraethylene glycol, 101 g of acrylic acid, and 1.5 g of methacrylic acid allyl ester were added and an excess of ammonia gas was introduced while stirring and cooling; (excess gas escaped into a safety vessel filled with 2% sulfuric acid). After the ammonia was completely added, the resulting yellow, slightly viscous solution was treated with 0.09 g of t-butyl perpivalate and heated to 80° C. to give a viscous, slightly yellowish suspension. After two hours at the reaction temperature, 0.62 g of t-butyl perpivalate was added and one hour later the same quantity of t-butyl perpivalate was again added. The mixture was then stirred for 3 hours at 80° C. and cooled.

Appearance: homogenous, beige suspension
Solid content: approximately 20%
current viscosity: approximately 5,000 mPa.s.
Stability in storage:

After approx. 1 week a very small residue of solvent formed.

B) Thickening effect a) Intrinsic thickening:

Viscosity of a 0.25% aqueous solution based on polymer of:

Example 1: 4,000–12,000 mPa.s
Example 2: 25 mPa.s b) External thickening of the thickeners according to the invention, as compared to a conventional thickener based on methacrylic acid (Rohagit®SD 15, 7.5% polymer content)

| Thickener Example 1 (g) | 100 g of dispersion to be thickened | relative need of polymer substitute compared to Rohagit ® SD 15 | Viscosity (after 1 hour) [mPa · s] |
| --- | --- | --- | --- |
| 1.25 | PLEXTOL ® BV 411 | 48 | 60 000 |
| 6 g ROHAGIT ® SD 15 | PLEXTOL ® BV 41 | 100 | 58 000 |
| 0.63 | PLEXTOL ® DV 475 | 49 | 38 000 |
| 3 g ROHAGIT ® SD 15 | PLEXTOL ® DV 475 | 100 | 50 000 |
| 1.3 | LIPOLAN ® TV 581 | 50 | 42 000 |
| 6 g ROHAGIT ® SD 15 | LIPOLAN ® TV 581 | 100 | 39 000 |

| Thickener Example 2 (g) | 100 g of dispersion to be thickened | Viscosity (after 1 hour) [mPa · s] |
| --- | --- | --- |
| 1.0 | PLEXTOL ® B 500 | 36 000 |
| 1.0 | PLEX ® 4998 D | 68 000 |

Plextol, Rohagit, Plex:

Trade names for commercially available or test products of Röhm GmbH, Darmstadt;

Lipolan: Trade name for product of HÜls AG, Marl

What is claimed as new and desired to be secured by letters patent of the United States is:

1. A water-soluble polymer suspension comprising more than 12% by weight of a copolymer comprising
   a) 30 to 99.99% by wt. of an alkali, ammonium, or amine salt of acrylic or methacrylic acid or a mixture thereof,
   b) 0.01 to 5% of a crosslinking monomer having at least two polymerizable double bonds and
   c) 0 to 69.99% by wt. of one or more hydrophilic comonomers different from a) and b) above, and at least one solvent selected from the group consisting of oligoalkylene oxide compounds of formula I

where
R=H or CH₃
R₁=H, CH₃ or C₂H₃
n=2, 3 or 4, wherein said suspension contains no more than 0.5% by weight of water, based on the total amount of said at least one solvent.

2. A water-soluble polymer suspension as claimed in claim 1, wherein said polymer is present in an amount greater than 13% by wt.

3. A water-soluble polymer suspension as claimed in claim 1, wherein said polymer is present in an amount of from 15 to 30% by wt.

4. A water-soluble polymer as claimed in claim 1, wherein said copolymer is prepared from polymerization of from 98 to 99.9% by wt. of ammonium (meth)acrylate and 0.1 to 2% by wt. of said crosslinking monomer.

5. A water-soluble polymer as claimed in claim 4, wherein said crosslinking monomer is selected from the group consisting of allyl (meth)acrylate or N-allyl (meth)acrylamide.

6. A water-soluble polymer as claimed in claim 1, wherein said at least one solvent is tripropylene glycol.

* * * * *